United States Patent [19]

Nashiki et al.

[11] Patent Number: 4,983,900
[45] Date of Patent: Jan. 8, 1991

[54] LINEAR ENCODER WITH PLURAL DETECTORS FOR USE WITH ONE OR MORE MAIN SCALES

[75] Inventors: Masayuki Nashiki; Keiji Matsui; Atushi Ieki, all of Ooguchi, Japan

[73] Assignee: Kabushiki Kaisha Okuma Tekkosho, Aichi, Japan

[21] Appl. No.: 401,057

[22] Filed: Aug. 31, 1989

[30] Foreign Application Priority Data

Aug. 31, 1988 [JP] Japan .................................. 63-217238

[51] Int. Cl.$^5$ .............................................. G05B 1/06
[52] U.S. Cl. .................................... 318/652; 318/638; 341/10; 341/11
[58] Field of Search ............................ 341/10, 11, 15; 83/522.15; 318/628, 632, 600, 636, 638, 652; 250/231.18

[56] References Cited

U.S. PATENT DOCUMENTS

| | | | |
|---|---|---|---|
| 3,090,896 | 5/1963 | Bowden et al. | 318/632 |
| 3,427,518 | 2/1969 | Cloup | 318/600 |
| 4,716,292 | 12/1987 | Rieder et al. | 341/11 X |
| 4,757,244 | 7/1988 | Iwamoto et al. | 318/652 |

Primary Examiner—William M. Shoop, Jr.
Assistant Examiner—Randy W. Gibson
Attorney, Agent, or Firm—Wenderoth, Lind & Ponack

[57] ABSTRACT

A linear encoder has a plurality short main scales arranged separately in their longitudinal direction and plural sliders situated in parallel with the longitudinal direction so as to more along these main scales. In operation, data obtained through these sliders are joined and processed in a signal processor in order to get position data of a table. Consequently, any position along a long movement stroke of the table can be detected easily and at a low cost.

5 Claims, 6 Drawing Sheets

LINEAR ENCODER WITH PLURAL DETECTORS FOR USE WITH ONE OR MORE MAIN SCALES

BACKGROUND OF THE INVENTION

The present invention relates to a linear encoder for detecting the positions of a table and the like of a machine tool, which table and the like moving linearly and for outputting position data of the positions detected.

Nowadays, in general, the conventional linear encoders of an optical type and a magnetic type have been used to detect the linear positions of a machine tool part.

The conventional linear encoder which is used commonly maybe an optical type or a magnetic type as shown in FIG. 1 and comprises a table 3 driven by the driving of a drive shaft 5 in the directions shown by the arrows, a main scale 1 having a gradation of information used as a standard of position and having its longitudinal axis arranged in parallel with a moving direction of the table 3, a slider 2 fixed to the table 3 so as to move together with the table 3 in order to read the information on the main scale 1, and to convert the information into an electrical signal S, and to output it, and a signal processor 4 for converting the electrical signal S sent from the slider 2 into position data $P_{OSD}$ and for outputting the position data.

It is necessary to lengthen the main scale of the conventional linear encoder, when the movement stroke of the table lengthens, in order to match with the lengthened stroke above. However, it is understood that precisely manufacturing the main scale in a form of one long member necessitates a very large manufacturing installation of high cost. Still more, the size of the manufacturing installation for the long main scale has a restriction, so that the length of the main scale manufactured by the installation has a limit. Accordingly, when it is necessary to manufacture very long main scale exceeding the restriction in length, a bonding or binding agent is used to joint two main scales, thereby obtaining a single long scale. It is noted that the jointing procedure of two scales necessitates many troublesome working steps, resulting in poor precision of such a jointed main scale.

SUMMARY OF THE INVENTION

It has been apparent from the above description that the present invention is attained in consideration of the shortcomings of the conventional linear encoder. Accordingly, it is a primary object of the present invention to provide a novel linear encoder enabling relatively short main scales provided in the linear encoder to detect positions along a long movement stroke of the table.

According to an aspect of this invention, for achieving the objects described above, there is provided a linear encoder comprising one or plural main scales arranged so as to place their longitudinal axis along a straight line on which a mover runs, plural sliders situated in parallel with said straight line so as to move relatively to said main scales, said sliders reading information on the main scale and changing the information into electric signals in order to output it, and a signal processor for determining the position data of said mover according to the position data indicating a position of said slider along a position detecting stroke and to said electric signal and outputting said position data of said mover.

The nature, principle and utility of the invention will become more apparent from the following detailed description when read in conjunction with the accompanying drawings.

DESCRIPTION OF THE PREFERRED EMBODIMENTS

Figure 1:
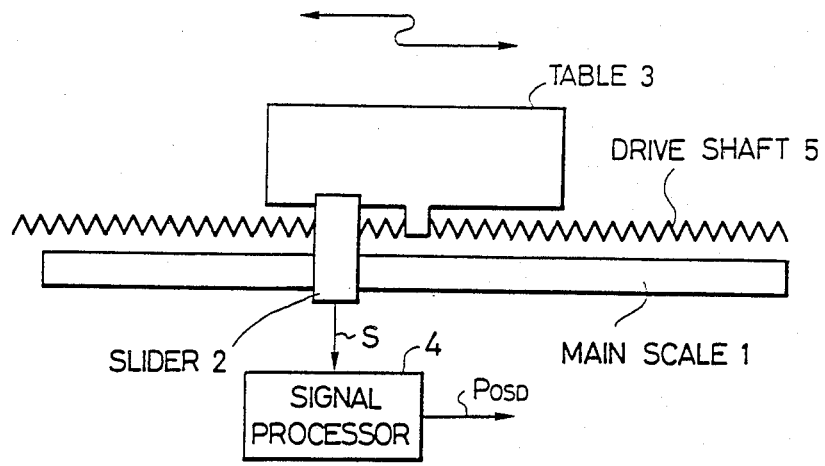
FIG. 1 is a view of a conventional linear encoder.
Figure 2:
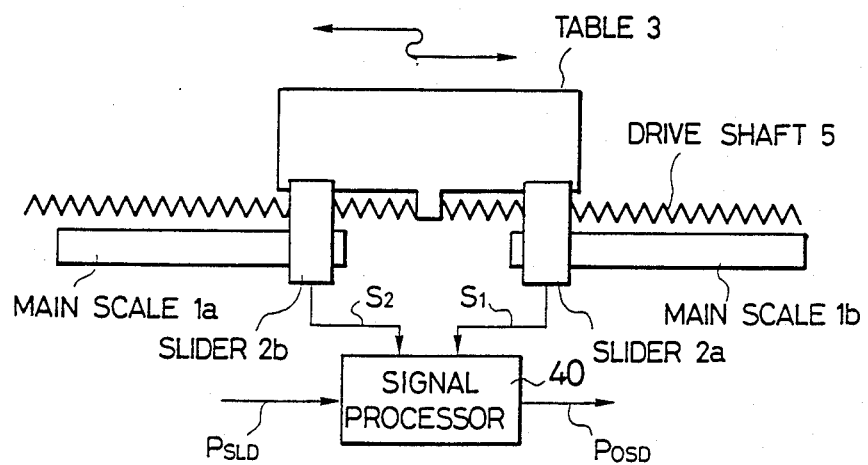
FIG. 2 is a view similar to FIG. 1 but that of, showing an embodiment of the linear encoder according to the present invention.

The preferred embodiment of the linear encoder according to the present invention is shown in FIG. 2 which corresponds to FIG. 1 depicting a conventional linear encoder. In both figures, identical reference characters and numerals designate corresponding parts and explanations for the identical and corresponding parts noted above are adopted in the following description for the present invention. It is understood that the linear encoder of the present invention comprises as shown in FIG. 2 two main scales $1a$ and $1b$ so arranged as to be parallel with the moving direction of the table 3 of a machine tool in their longitudinal directions and leave a gap between the scales in a line, these main scales $1a$ and $1b$, respectively having graduations of positional standard information thereon, a pair of sliders $2a$ and $2b$, respectively fixed to the table 3 with a predetermined distance so as to move together with the table 3, to read-out the information on the main scales $1a$ and $1b$, and to convert the information into electrical signals $S_1$ and $S_2$ and to output these signals, and a signal processor 40 for determining position data $P_{OSD}$ of the table 3 by outside slider position data $P_{SLD}$ and the electrical signals $S_1$ and $S_2$ of the sliders $2a$ and $2b$. It is noted that the distance between the slider $2a$ and slider $2b$ is wider than that between the main scale $1a$ and main scale $1b$, and is shorter than the length of the main scale $1a$ or $1b$.

Figure 3:
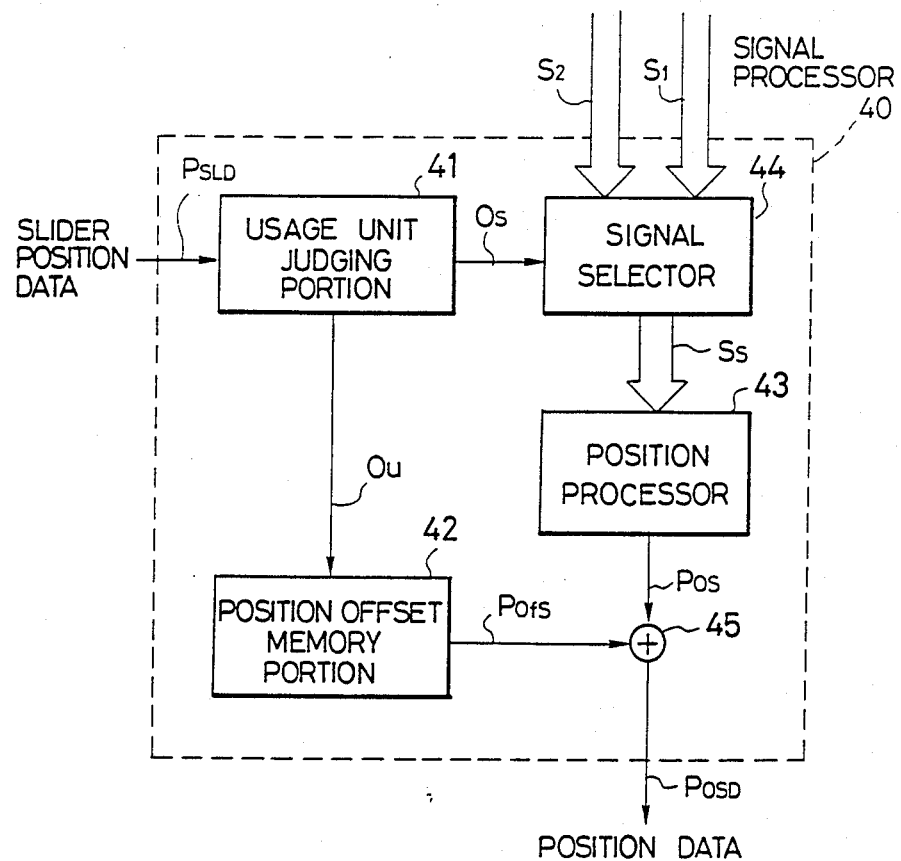
FIG. 3 is a block diagram showing an embodiment of a signal processor of the linear encoder according to the present invention.

FIG. 3 is a block diagram showing an embodiment of the signal processor 40, which comprising a usage unit judging portion 41 for judging or determining a combination or unit of the sliders $2a$ or $2b$ and the main scale $1a$ or $1b$ according to the slider position data $P_{SLD}$ from the outside, a signal selector 44 for selecting the necessary signal $S_S$ from the electrical signals $S_1$ and $S_2$ obtained from the sliders $2a$ and $2b$ according to a usage slider command $O_s$ obtained from the usage unit judging portion 41, and a position processor 43 for converting the electrical signal $S_s$ obtained from the signal selector 44 into digital data and processing the data positionally so as to determine the predetermined position data $P_{OS}$. In addition, the signal processor 40 has a position offset memory portion 42 for previously storing positional offsets related to the combination (unit) of the sliders 2a and 2b and the main scales 1a and 1b so as to output a position offset $P_{ofs}$ corresponding to a usage unit command $O_u$ from the usage unit judging portion 41, and an adder 45 for adding the position data $P_{OS}$ from the position processor 43 and the position offset $P_{ofs}$ from the position offset memory portion 42 in order to determine position data $P_{OSD}$ of the table 3.

Figure 4:
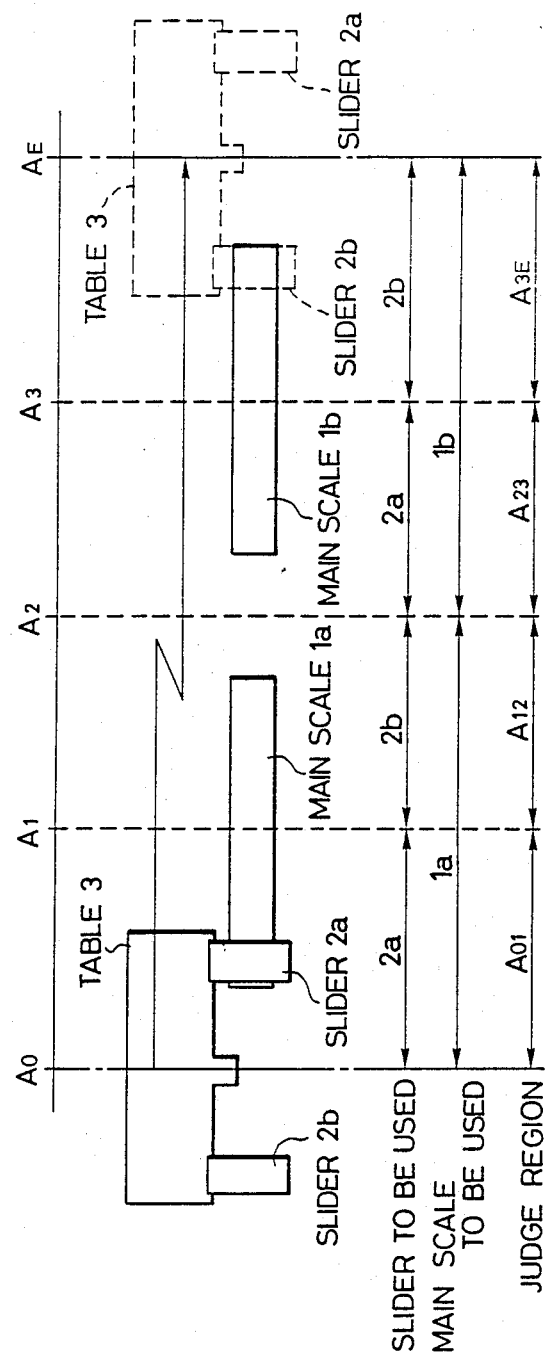
FIGS. 4 and 5 are operational views for explaining the operations of the linear encoder according to the present invention.
Figure 5:
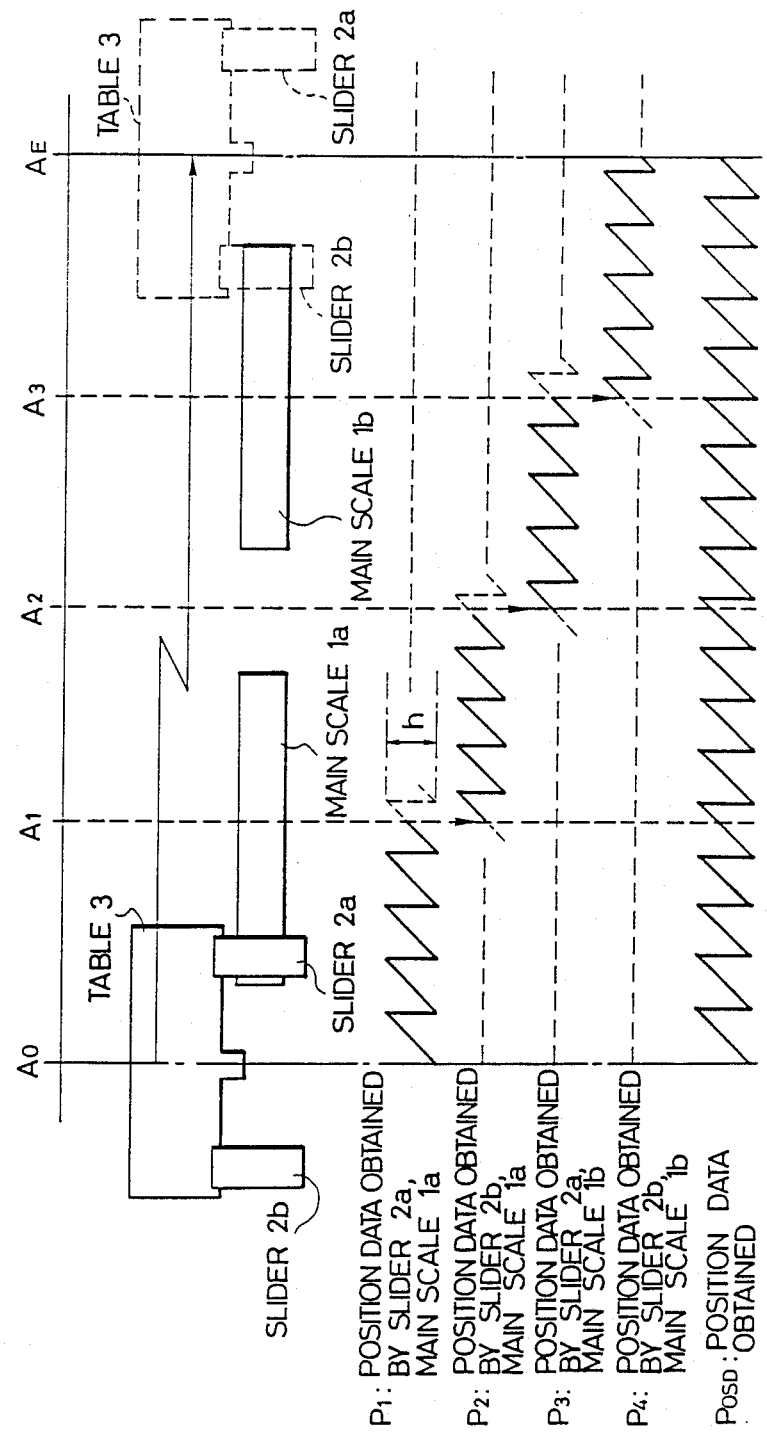

The operation of the signal processor 40 will be described with reference to FIGS. 4 and 5. The slider position data $P_{SLD}$ which is determined when the table 3 (for example the mid point of the slider 2a and slider 2b) moves longitudinally from position $A_0$ to position $A_E$, and shown as $A_0 \rightarrow A_1 \rightarrow A_2 \rightarrow A_3 \rightarrow A_E$ will be described hereinafter. For example, an external or outside detector (not shown) of a upper category detects the absolute positions of the table 3 along its full stroke, or a limit switch or the like judges or determines the range in which the table 3 is situated, or the linear encoder of the present invention of an incremental type returns to its zero point in order to determine the initial position of the table 3, and then the position data obtained is counted determining the slider position data $P_{SLD}$.

Using the slider position data $P_{SLD}$ obtained in such a manner as described above, the usage unit judging portion 41 judges the combination (unit) of the slider 2a or 2b and the main scale 1a or 1b, respectively to be used. For example, when the table 3 (the mid point of the slider 2a and the slider 2b) is placed in the judge region $A_{01}$, it is judged that the combination to be used is one of the slider 2a and the main scale 1a, obtaining a usage slider command $2a(O_s)$.

Using the usage slider command $2a(O_s)$, the signal selector 44 selects a necessary electrical signal $S_1(S_S)$ being sent to the position processor 43. The electrical signal is converted into digital data and processed in the position processor 43, determining a predetermined position data $P_1(P_{OS})$. This position data $P_1(P_{OS})$ indicates an absolute position in the period of the electrical signal $S_1(S_S)$ and a height h of the data shaped like a sawtooth is a range of the absolute position. The position offset $P_{ofs}$ correcponding to the usage unit commands 2a and $1a(O_u)$ outputted from the position offset memory portion 42 is added to the position data $P_1(P_{os})$ obtained from the position processsor 43, determining a position data $P_{OSD}$. The operation mentioned above is repeated for each of the judge regions $A_{12}$, $A_{23}$ and, $A_{3E}$, and respective position data are joined thereby determining a position data $P_O$ of the table 3.

Figure 6:
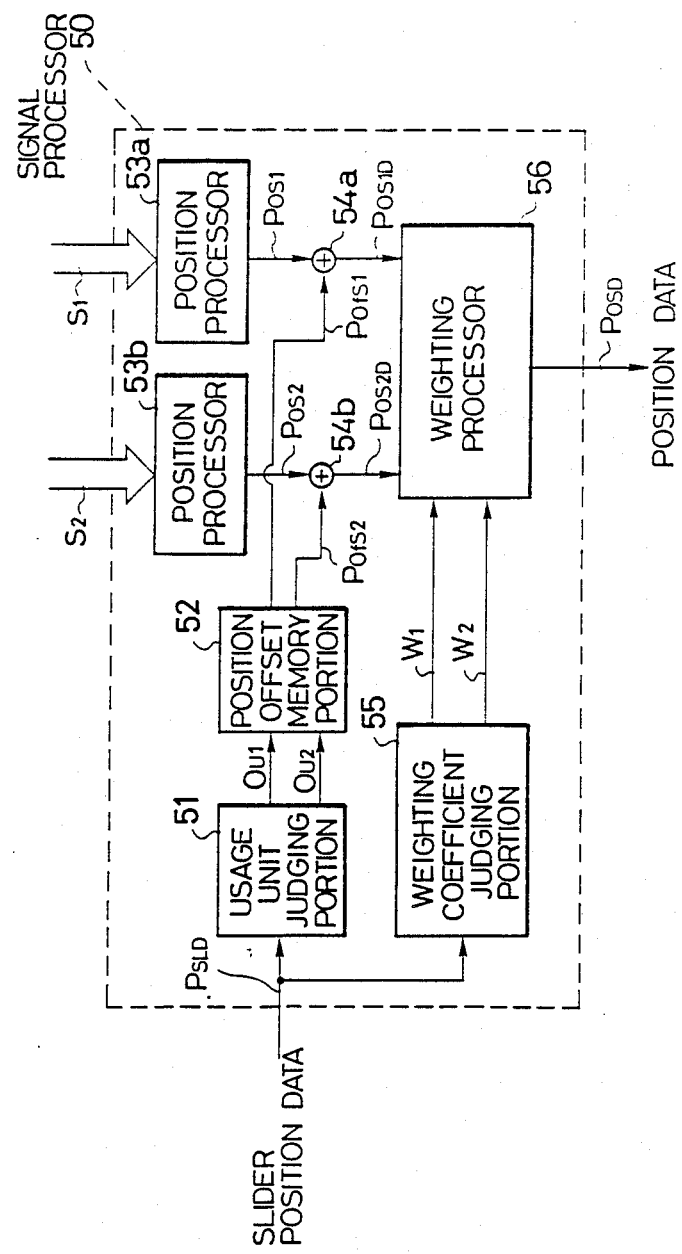
FIG. 6 shows another embodiment of the signal processor of the linear encoder according to the present invention.

FIG. 6 shows a block diagram of another embodiment of the signal processor. The signal processor 50 comprises a usage unit judging portion 51 for judging two combinations (units) of the sliders 2a and 2b to use and the main scales 1a and 1b to use, a position offset memory portion 52 for previously storage a position offset for the combination (unit) of the sliders 2a, 2b and the main scales 1a, 1b and outputting the position offsets $P_{ofs1}$, $P_{ofs2}$, respectively corresponding to usage unit commands $O_{u1}$, $O_{u2}$ from the usage unit judging portion 51, and a position processors 53a and 53b for converting the electrical signals $S_1$, and $S_2$ "from the sliders 2a and 2b; into digital data in order to carry out a positional processing and to determine the predetermined position data $P_{OS1}$, and $P_{OS2}$. Furthermore, the signal processor 50 has a pair of adders 54a, and 54b for adding the position data $P_{OS1}$, and $P_{OS2}$ sent from the position processors 53a, and 53b to the position offsets $P_{ofs1}$, and $P_{ofs2}$ sent from the position offset memory portion 52, a weighting coefficient judging portion 55 for judging weighting coefficients $W_1$, and $W_2$ according to the importance and reliability of the slider position data $P_{SLD}$ from the outside, and weighting processor 56 for seeking position data $P_{OSD}$ of the table 3 according to the weighting coefficients $W_1$, and $W_2$ sent from the weighting coefficient judging portion 55 and a the corrected position data $P_{OS1D}$, and $P_{OS2D}$ sent from the adders 54a, 54b.

The weighting coefficients $W_1$, and $W_2$, respectively sent from the weighting coefficient judging portion 55 installed in the signal processor 50 will be explained with reference to FIG. 7.

Figure 7:
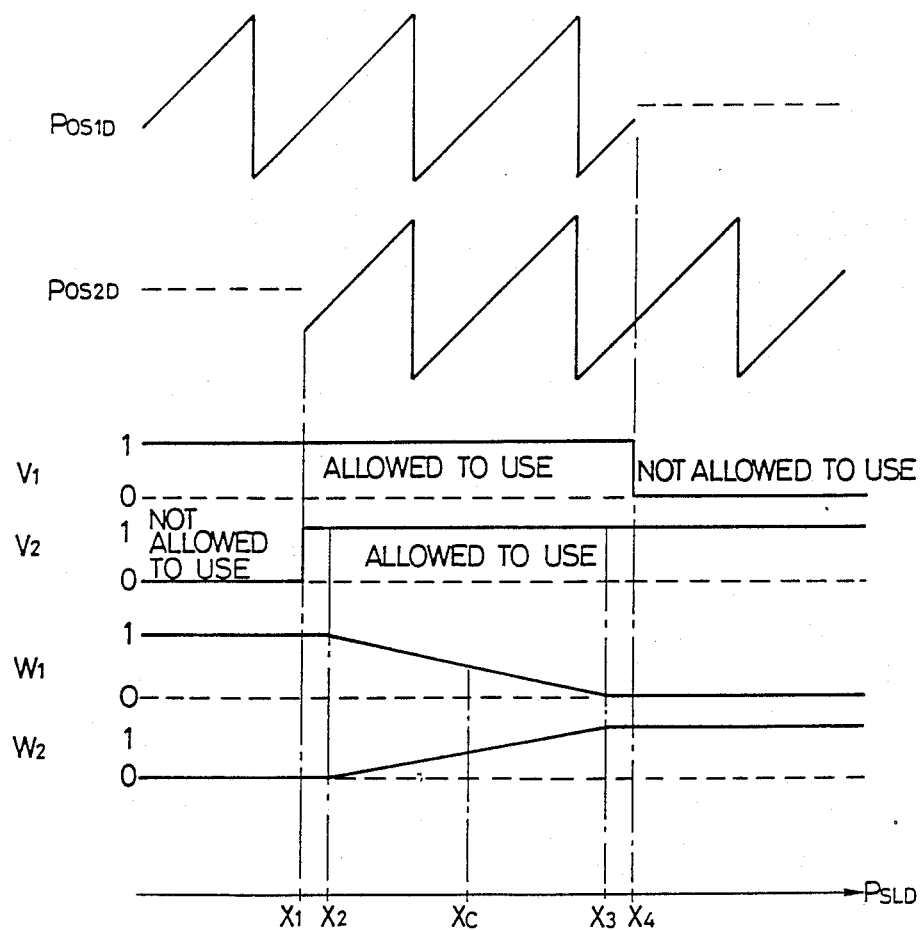
FIG. 7 is an embodiment of inner data of the signal processor shown in FIG. 6.

$V_1$ and $V_2$ shown in FIG. 7 indicate whether or not the corrected position data $P_{OS1D}$ and $P_{OS2D}$ corresponding to the slider position data $P_{SLD}$ can be used as position data, and $W_1$ and $W_2$ indicate $V_1$, and $V_2$ which are made of ambiguous functions. The broken line portions of the corrected position data $P_{OS1D}$, $P_{OS2D}$ in FIG. 7 show the regions ($P_{SLD}<X_1$, and $X_4<P_{SLD}$) which are not used as position data because the slider and the main scale fail to face each other in this region, making $V_1$ and $V_2$ equal to "0". The solid line portions of the corrected position data $P_{OS1D}$, and $P_{OS2D}$ show the region ($X_1<P_{SLD}<X_4$) which is used as position data because the slider correctly faces the main scale, making $V_1$ and $V_2$ equal to "1".

In the region in which the corrected position data $P_{OS1D}$, and $P_{OS2D}$ can be used as position data, the position data of the table 3 can be obtained by using either of the position data of the corrected position data $P_{OS1D}$, and $P_{OS1D}$, making disadvantageously some errors in the table position data because respective sliders have different characteristics. When the corrected position data $P_{OS1D}$, and $P_{OS2D}$ are exchanged at any position of the table in order to make the error smaller, some divergence is generated in the position data obtained, so that it is better to use $W_1$ and $W_2$ which are obtained by adding ambiguousness to $V_1$ and $V_2$ as the weighting coefficients for the corrected position data $P_{OS1D}$, and $P_{OS2D}$. It is noted that one weighting coefficient $W_1$ or $W_2$ exists for a particular slider position data $P_{SLD}$ and the weighting coefficient $W_1$ and $W_2$ is a membership function making the slider position data $P_{SLD}$ and element of the function. The weighting coefficient $W_1$ depicts a degree of usage of the corrected position data $P_{OS1D}$ and the weighting coefficient $W_2$ is a degree of usage of another data $P_{OS2D}$. On the contrary, the weighting coefficient $W_1$ is a degree of non-use of the corrected position data $P_{OS2D}$ and the coefficient $W_2$ is one of the data $P_{OS1D}$. It is apparent that these coefficients $W_1$ and $W_2$ have a complementary relationship and an equation: $W_1+W_2=1$ is formed. Accordingly it is preferable to use the corrected position data $P_{OS1D}$ and not use the position data $P_{OS2D}$ until the slider position data $P_{SLD}$ reaches the position of $X_2$. The usage of the corrected position data $P_{OS1D}$ decreases gradually with the position changes or progresses from $X_2$ to $X_c$, and simultaneously the usage of the corrected position data $P_{OS2D}$ increases gradually. At the position $X_c$ in FIG. 7, both corrected position data $P_{OS1D}$ and $P_{OS2D}$ are used at substantially the same degree. Progressing from the position $X_c$ to the position $X_3$, the usage of the corrected position data $P_{OS1D}$ further decreases and simultaneously the usage of another data $P_{OS2D}$ further increases, making the former data $P_{OS1D}$ non-used and the latter one $P_{OS2D}$ used. These membership functions $W_1$ and $W_2$ are set according to the particular condition of arrangement of the slider and the main scale.

One example of the calculation carried out in the weighting processor 56 is shown in a form of equation (1) as follows:

$$P_{OSD} = P_{OS1D} \times W_1 + P_{OS2D} \times W_2 \quad (1)$$

The calculation of the equation (1) enables one to obtain precise position data, which is not one-sided to either position data obtained by two sliders 2a, and 2b.

It is possible to use one position processor for processing both electrical signals $S_1$ and $S_2$ sent from the two sliders 2a and 2b.

When the table 3 is situated at the position at which one of these sliders 2a, and 2b doesn't completely function, the electrical signal from the non-functional slider may not be processed positionally.

Although two main scales and two sliders are employed in the respective embodiments of the present invention and explained them above, the number of these sliders and scales in not limited or restricted to two; and apparently more than two sliders and scales may be used in other embodiments of the linear encoder according to the invention, obtaining the same effect.

When more than two main scales and more than three sliders are adopted in the linear encoder, it is necessary to widen the distance between these sliders situated at both the ends of the table 3 so as to be greater than the distance between adjacent main scales, and to shorten the distance between adjacent sliders so as to be less than the length of the main scale. When one main scale and plural sliders are employed, the distance between the adjacent sliders must be shorter than the length of the main scale.

As mentioned above, according to the linear encoder of the present invention, it is possible to carry out precise positional detection without long main scales even when the movement stroke of the linear encoder is long. As a result, it is possible to manufacture the linear encoder economically or at a low cost, as well as without any conventional joining procedure of the main scales, resulting in a considerable decrease of manufacturing steps for the linear encoder of the present invention. It should be understood that many modifications and adaptations of the invention will become apparent to those skilled in the art and it is intended to encompass such obvious modifications and changes in the scope of the claims appended hereto.

What is claimed is:

1. A linear encoder comprising:
   at least one main scale arranged so that its longitudinal axis is disposed along a straight line on which a mover runs;
   a plurality of sliders situated in parallel with said straight line so as to move relative to said at least one main scale, said plurality of sliders reading information disposed on said at lest one main scale and outputting electrical signals corresponding to said information; and
   a signal processor for determining and outputting position data of said mover according to said electrical signals output from said plurality of sliders, each of said electrical signals respectively containing slider position data indicating a position of its respective slider along a position detecting stroke; wherein said signal processor comprises: a usage unit judging portion for judging a combination of a slider selected from said plurality of sliders to be used and a main scale selected from said at least one main scale facing said slider on the basis of said slider position data and for providing a usage slider command in response thereto; a signal selector for selecting one electrical signal from said electrical signals output from said plurality of sliders according to said usage slider command output by said usage unit judging portion; a position processor for determining position-related data according to said electrical signal selected by said signal selector; a position offset memory portion for previously storing a position offset related to a combination of a slider selected from said plurality of sliders and a main scale selected from said at least one main scale and for outputting a position offset corresponding to each of said combinations of said selected slider and selected said main scale, respectively judged by said usage unit judging position; and an adder for adding data output from said position processor to said position offset output from said position offset memory portion in order to obtain and output said position data of said mover.

2. A linear encoder comprising:
   at least one main scale arranged so that its longitudinal axis is disposed along a straight line on which a mover runs;
   a plurality of sliders situated in parallel with said straight line so as to move relative to said at least one main scale, said plurality of sliders reading information disposed on said at least one main scale and outputting electrical signals corresponding to said information; and
   a signal processor for determining and outputting position data of said mover according to said electrical signals output from said plurality of sliders, each of said electrical signals respectively containing slider position data indicating a position of its respective slider along a position detecting stroke;
   wherein said signal processor comprises: a usage unit judging portion for judging a combination of two sliders selected from said plurality of sliders and a main scale selected from said at least one main scale facing said two sliders according to said slider position data; a position offset memory portion for previously storing a position offset related to a combination of one of said two sliders and said selected main scale and for outputting a position offset corresponding to each of said combinations of said selected slider and main scale judged by said usage unit judging portion; a position processor for determining data related to each of said slider positions according to electrical signal outputted from said two sliders; an adder for adding said position offset output from said position offset memory portion to data output from said position processor; a weighting coefficient judging portion for judging and outputting respective weighting coefficients of two usage units according to said slider position data, and a weighting processor for determining and outputting said position data of said mover on the basis of data outputted from said adder and said weighting coefficients output from said weighting coefficient judging portion.

3. A linear encoder as set forth in claim 2, wherein, when a region of a weighting coefficient to be judged by said weighting coefficients judging portion is from 0 to 1, a total of the weighting coefficients is set equal to 1, such that one of said weighting coefficients is 1 and the remaining weighting coefficients are all set equal to 0 or two weighting coefficients slider are each between 0 and 1.

4. A linear encoder as set forth in claim 2, wherein said weighting processor is arranged such that, when one of said weighting coefficients is 1, it outputs position data as is obtained from a slider, and when two weighting coefficients are each between 0 and 1, position data obtained from a slider are multiplied by a respective weighting coefficient in order to output the result of said multiplication as position data.

5. A linear encoder which outputs position data corresponding to a position of a mover which moves in a straight line and which comprises:
   a plurality of main scales disposed such that their longitudinal axes are along a straight line;
   a plurality of sliders disposed in parallel with said straight line so as to move relative to said plurality of main scales, said plurality of sliders reading information on said main scales and outputting electrical signals corresponding to said information; wherein a distance between a pair of said plurality of sliders respectively placed at far-end positions is greater than a distance between an adjacent pair of said plurality of main scales and wherein a distance between an adjacent pair of said plurality of sliders is less than a length of said plurality main scales;
   a signal processor for converting respective electrical signals outputted from said plurality sliders into first position data, and for obtaining second position data of said mover in accordance with said first position data and slider position data indicating the positions of said plurality of sliders within a position detecting stroke, and for outputting said second position data.

* * * * *